United States Patent [19]
Dowd et al.

[11] Patent Number: 5,980,230
[45] Date of Patent: *Nov. 9, 1999

[54] FORMING FASTENER PRODUCTS

[75] Inventors: Clinton Dowd, Goffstown, N.H.; Keith G. Buzzell, North Waterboro, Me.

[73] Assignee: Velcro Industries B.V., Curacao, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/843,017

[22] Filed: Apr. 11, 1997

[51] Int. Cl.⁶ .................................................. B29C 69/02
[52] U.S. Cl. ...................... 425/324.1; 264/296; 425/394; 425/453
[58] Field of Search ............................... 425/324.1, 394, 425/453, 575, 576; 264/296

[56] References Cited

U.S. PATENT DOCUMENTS

| | | |
|---|---|---|
| 2,499,898 | 3/1950 | Anderson . |
| 3,031,730 | 5/1962 | Morin . |
| 3,101,517 | 8/1963 | Fox et al. . |
| 3,138,841 | 6/1964 | Naimer . |
| 3,192,589 | 7/1965 | Pearson . |
| 3,266,113 | 8/1966 | Flanagan . |
| 3,320,649 | 5/1967 | Naimer . |
| 3,353,663 | 11/1967 | Kayser . |
| 3,367,809 | 2/1968 | Soloff . |
| 3,408,705 | 11/1968 | Kayser et al. . |
| 3,471,903 | 10/1969 | Northrup et al. . |
| 3,607,995 | 9/1971 | Chiba . |
| 3,702,750 | 11/1972 | Veneria . |
| 3,718,725 | 2/1973 | Hamano . |
| 3,770,359 | 11/1973 | Hamano . |
| 3,808,648 | 5/1974 | Billarant et al. . |
| 3,830,613 | 8/1974 | Aoki . |
| 3,889,448 | 6/1975 | Russell . |
| 4,290,174 | 9/1981 | Kalleberg . |
| 4,709,824 | 12/1987 | Thompson ............................ 264/296 |
| 4,725,221 | 2/1988 | Blanz . |
| 4,793,506 | 12/1988 | Thompson ............................ 264/296 |
| 4,810,181 | 3/1989 | Ozawa . |
| 4,872,304 | 10/1989 | Thompson ............................ 264/296 |
| 5,008,060 | 4/1991 | Kanai et al. ......................... 264/296 |
| 5,038,455 | 8/1991 | Guest ................................... 264/296 |
| 5,077,870 | 1/1992 | Melbye et al. . |
| 5,160,474 | 11/1992 | Huff ..................................... 264/296 |
| 5,242,646 | 9/1993 | Torigoe et al. . |
| 5,318,435 | 6/1994 | Brown et al. . |
| 5,368,549 | 11/1994 | McVicker . |
| 5,460,769 | 10/1995 | Kaneko . |
| 5,656,226 | 8/1997 | McVicker . |
| 5,695,704 | 12/1997 | Sugiura et al. ....................... 264/296 |

FOREIGN PATENT DOCUMENTS

| | | |
|---|---|---|
| 2027794 | 2/1980 | United Kingdom . |
| WO 94/23610 | 10/1994 | WIPO . |

OTHER PUBLICATIONS

PCT/US98/07170 International Search Report mailed Jun. 19, 1998 (five sheets).

*Primary Examiner*—James P. Mackey
*Attorney, Agent, or Firm*—Fish & Richardson P.C.

[57] ABSTRACT

A method and apparatus for forming a fastener product are disclosed. The method comprises molding a preform member in a mold cavity defined by first and second parts of a mold, removing the first part of the mold to expose an array of preform elements of the preform member while the member remains within the second part of the mold, and, while holding the member by the second part of the mold, performing a subsequent forming operation on the preform elements. The apparatus deforms the preform elements, preferably with a heated mold plate, to form fastener elements while holding the member by the second part of the mold. In a preferred embodiment the resulting elements are mushroom-shaped and the preform is held in the second part of the mold by another fastening feature. Both reciprocating and rotary-type machines are disclosed.

18 Claims, 7 Drawing Sheets

FORMING FASTENER PRODUCTS

BACKGROUND OF THE INVENTION

Thermoplastic fastener products having an array of integrally formed, upstanding, engageable fastener elements are employed in a wide variety of instances to enable releasable attachment of two surfaces. Often such products are formed in discrete mold cavities by injection molding techniques. Some such fastener products are said to be "self-engaging", that is, capable of engaging an identical product to form a fastening. Some self-engaging fastener elements are called "mushroom-shaped" because they have stems with overhanging heads. Because of their widespread commercial use, more efficient and cost-effective methods and machines for producing these fastener products are desirable.

SUMMARY OF THE INVENTION

According to one aspect of the invention, a method of forming a fastener product includes the steps of molding a preform member in a mold cavity defined by first and second parts of a mold, removing the first part of the mold to expose an array of preform elements of the preform member while the member remains within the second part of the mold, and, while holding the member by the second part of the mold, performing a subsequent forming operation on the preform elements.

By "array" we mean that there are at least about 10 preform elements, preferably more than about 30 preform elements. The elements may be in any arrangement suitable for performing their intended fastening function, and may form geometric patterns.

In a preferred embodiment, the subsequent forming operation permanently deforms the preform elements by heat and pressure.

In some cases the preform elements have stems and the subsequent forming operation forms overhanging heads on the preform stems. In one embodiment the heads are mushroom-shaped.

In some embodiments the method includes the steps of forming a holding feature integral with the product during the molding process and holding the product by the holding feature within the second part of the mold during the subsequent forming operation.

In one embodiment, the holding feature is a fastening element constructed for releasable fastening to a mating member after the subsequent forming operation.

In some embodiments the method includes moving the second part of the mold from an injection-molding location to a subsequent forming location. In some cases the second part of the mold is moved along a reciprocal path, and in some other cases it is moved in a rotary sense.

According to another aspect of the invention, an apparatus for forming a fastener product has at least two molds in which a preform member is injection molded. Each mold has at least a first and second part, the first part being removable from the second part to expose an array of preform elements of the preform member while the member remains within the second part of the mold. The apparatus includes a forming device to deform the preform elements to form fastener elements while holding the member by the second part of the mold.

In the presently preferred embodiment the forming device includes a heated mold plate.

In some useful configurations the second part of the mold is constructed to define a molding cavity to both form an injection-molded feature of the final product and hold the preform member by the feature while the fastener elements are formed. In some cases the feature is a fastening element.

In some embodiments, the apparatus also includes an injection-molding location, a forming location, and means to move the second part of one of the two molds to the injection-molding location and simultaneously move the second part of the other of the two molds to the forming location. In some cases the means is constructed to move the second parts of the two molds along a reciprocal path; in some other cases the means is constructed to move the second parts of the two molds in a rotary sense.

In some embodiments the apparatus is constructed and arranged to injection mold a first preform member in one of the two molds while simultaneously deforming the preform elements of a second preform member in the other of the two molds.

According to one aspect of the invention, an apparatus for forming a fastener product includes a. means for molding a preform member in a mold cavity defined by first and second parts of a mold,
 b. means for removing the first part of the mold to expose an array of preform elements of the preform member while the member remains within the second part of the mold, and
 c. means for performing a subsequent forming operation on the preform elements while holding the member by the second part of the mold.

Employing the second part of the mold to hold the preform member during the subsequent forming operation advantageously locates and supports the preform product for improved head formation. The molding process is simple, not requiring complicated slides to open otherwise die-locked mushroom-shaped cavities or deforming solidified fastener elements to pull them from the mold. The post-forming process enables the production of heads with extensive overhanging portions that would be difficult to pull intact from solid mold cavities. Providing an apparatus with a forming location separate from a molding location, arranged such that molds may be moved between the forming and molding locations in either a reciprocating or rotary motion, enables efficient production cycle times and low production costs. The holding feature of the finished fastener product advantageously, in some preferred embodiments, provides a means of permanently or releasably securing the fastener product during use.

DESCRIPTION OF THE PREFERRED EMBODIMENTS

Figure 1:
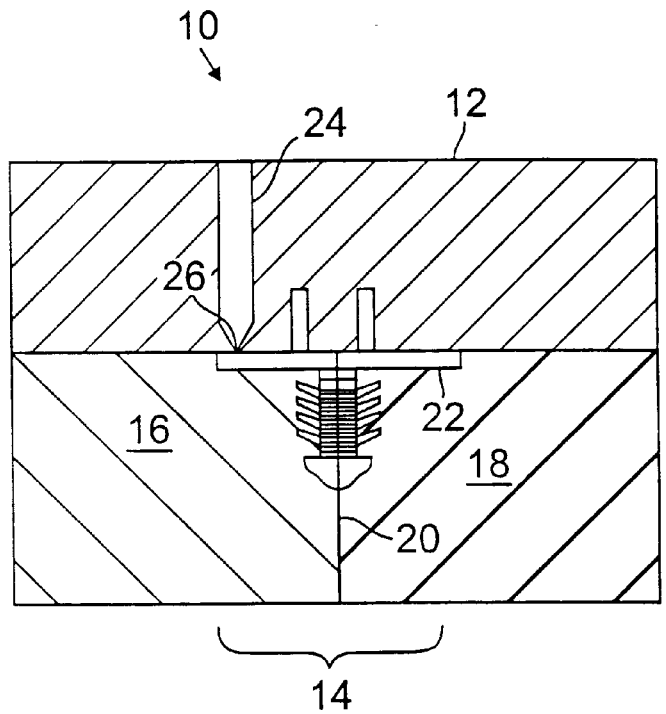
FIG. 1 is a cross-sectional view of an injection mold, according to the invention, taken through a mold cavity with the mold closed.

Referring to FIG. 1, an injection mold 10 for molding a fastener product preform consists of an upper part 12 and a lower part 14. Lower part 14 has two sections, 16 and 18, abutting at seam 20. Together, lower part sections 16 and 18 and upper part 12 define a mold cavity 22 shaped to form the preform product. A runner 24 and gate 26 provide means to inject molten resin into cavity 22.

Figure 2:
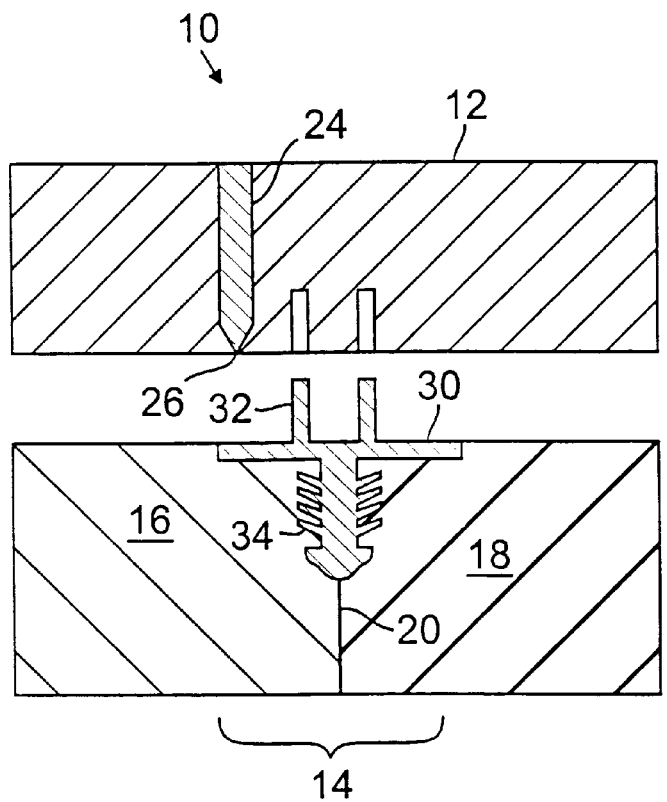
FIG. 2 is a cross-sectional view of the mold of FIG. 1, opened with a molded preform in the mold cavity.

Referring to FIG. 2, after resin 28 has been injected into mold 10 to form a preform fastener product 30, upper mold part 12 is removed to expose an array of upstanding preform stems 32 integrally molded with preform product 30. For illustration, only two stems 32 are shown to represent an entire array. During the removal of upper mold part 12, preform 30 is held within lower mold part 14 by a holding feature 34 of preform 30. In the presently preferred embodiment, holding feature 34 comprises a "christmas tree"-type fastener element, as shown, although other feature shapes may be employed to retain preform 30 in lower mold part 14 while the mold is opened to expose stems 32.

Figure 3:
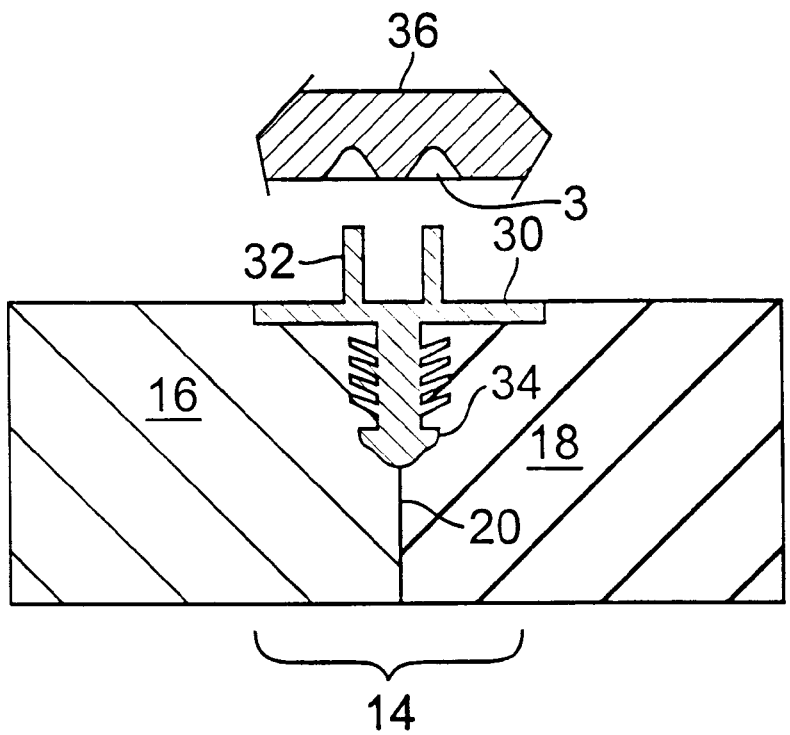
FIGS. 3–5 sequentially illustrate the preform being post-formed while retained in one part of the mold.
Figure 4:
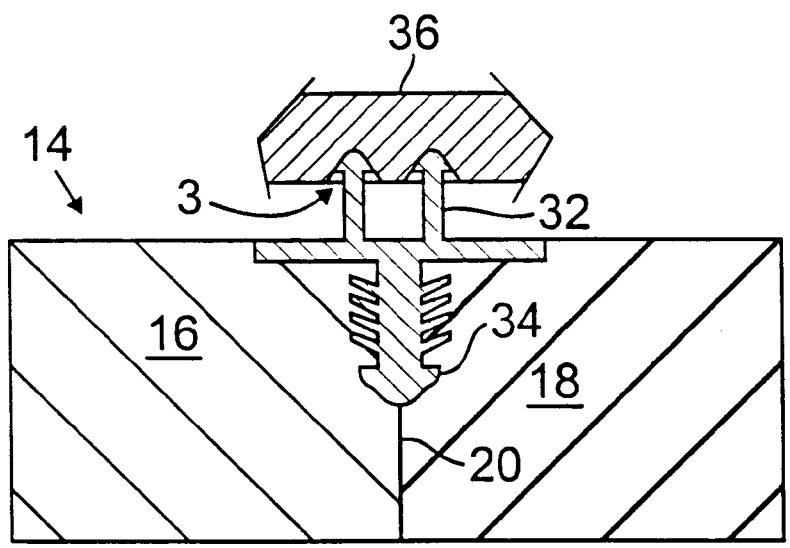
Figure 5:
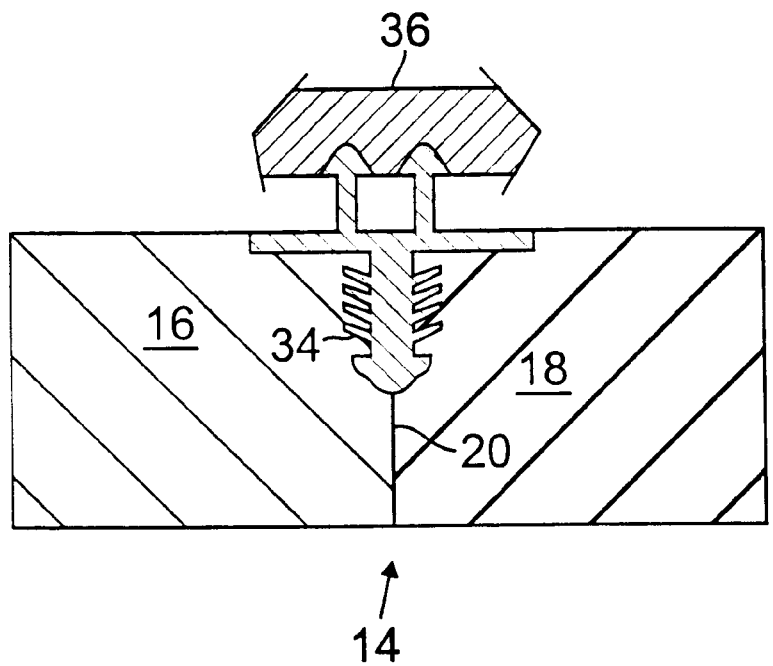

Referring to FIGS. 3 through 5, after the preform product 30 has been molded and stems 32 exposed, but while the preform is still retained and supported by lower mold part 14, stems 32 are permanently deformed by a heated forming plate 36 to form overhanging heads 38 suitable for releasably fastening the completed fastener product 40 to a mating surface in use. Forming plate 36 has cavities 39 shaped to form heads 38 by applying downward pressure against stems 32 by plate 36. Because the preform product 30 has been securely retained in lower mold part 14, stems 32 are maintained in a precise, known position (accounting for predictable material shrinkage) so that heated forming plate 36 can be lowered with cavities 39 in proper alignment.

During this process the lower regions of the stems, away from the direct contact of the forming plate cavities, remain at a lower temperature at which they retain their structural integrity to support the pressure applied by the forming plate. The lower part of the mold provides sturdy support for the preform product during the application of the head-forming pressure.

In one example polypropylene, with a glass transition temperature $T_g$ below room temperature and a melt temperature $T_m$ of about 300 degrees F., was molded to produce a preform product having an array of 0.08 inch long cylindrical stems 32 of 0.012 inch diameter. Mushroom-shaped heads, of about 0.040 inch final diameter, were post-formed on the stems using a forming plate 36 heated to a temperature of 375 degrees F. The forming plate was held against the stems for about 1.5 seconds, loaded with a consistent pressure equivalent to about 2.5 pounds per square inch on the lower portions of the preform stems, and then removed.

Figure 6:
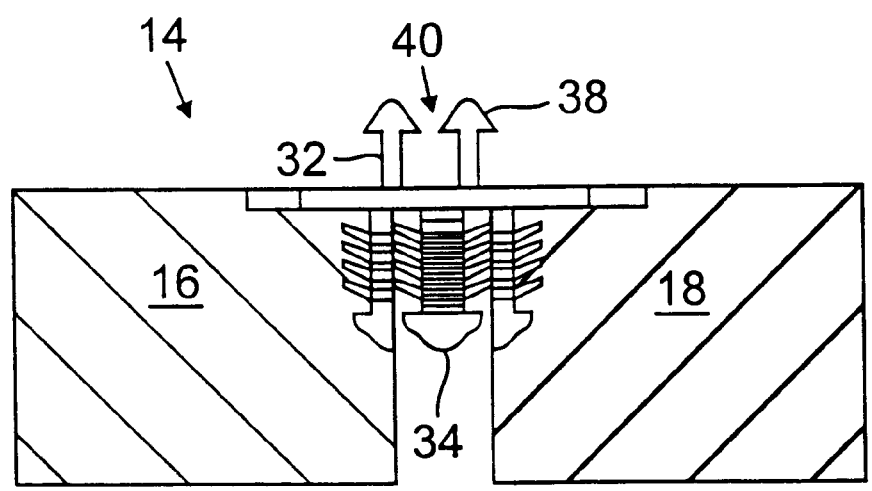
FIG. 6 shows the mold part of FIG. 5 being opened to release a finished fastener product.

Referring to FIG. 6, after molded stems 32 of the preform product have been post-formed to create heads 38 on their distal ends and the forming plate has been removed, sections 16 and 18 of the lower mold part are separated to release holding feature 34 of the completed fastener product 40, and the finished product is removed. At the completion of the cycle, the lower mold sections 16 and 18 are rejoined, forming mold cavity 22 along with upper mold part 12 (FIG. 1), and the process is repeated to produce another finished product 40.

Figure 7:
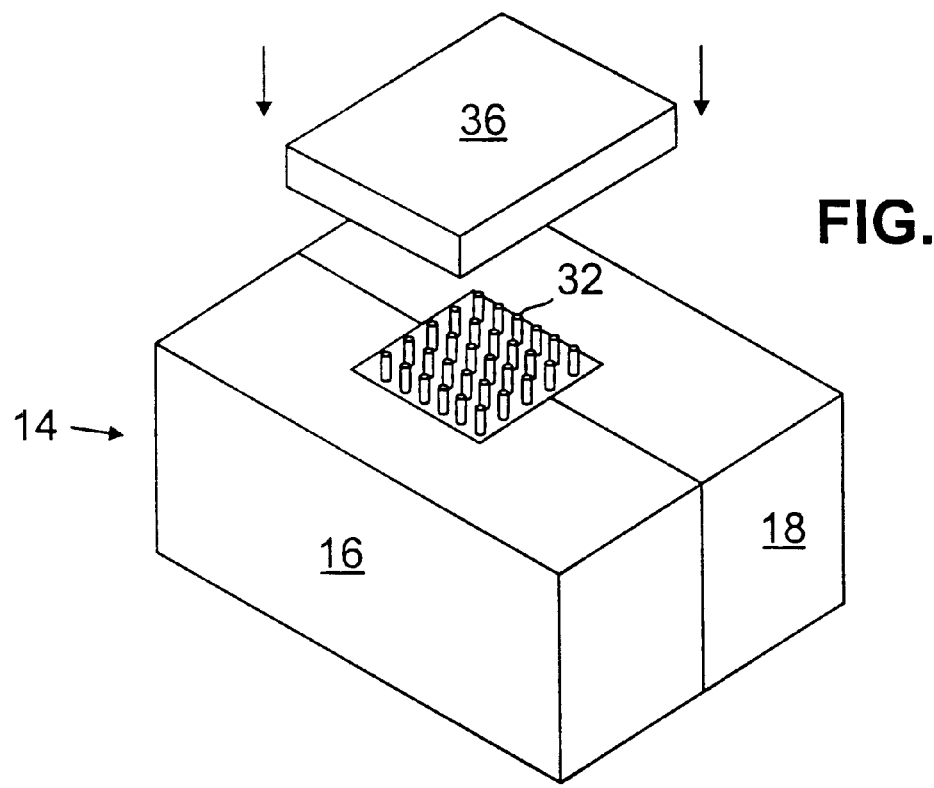
FIGS. 7–9 sequentially illustrate post-forming heads on an array of fastener element stems with a heated plate.
Figure 8:
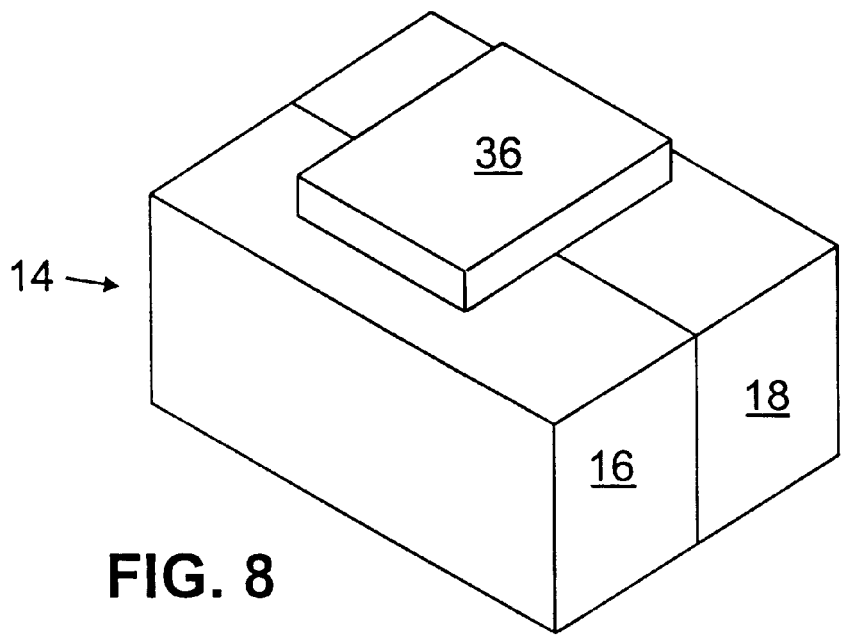
Figure 9:
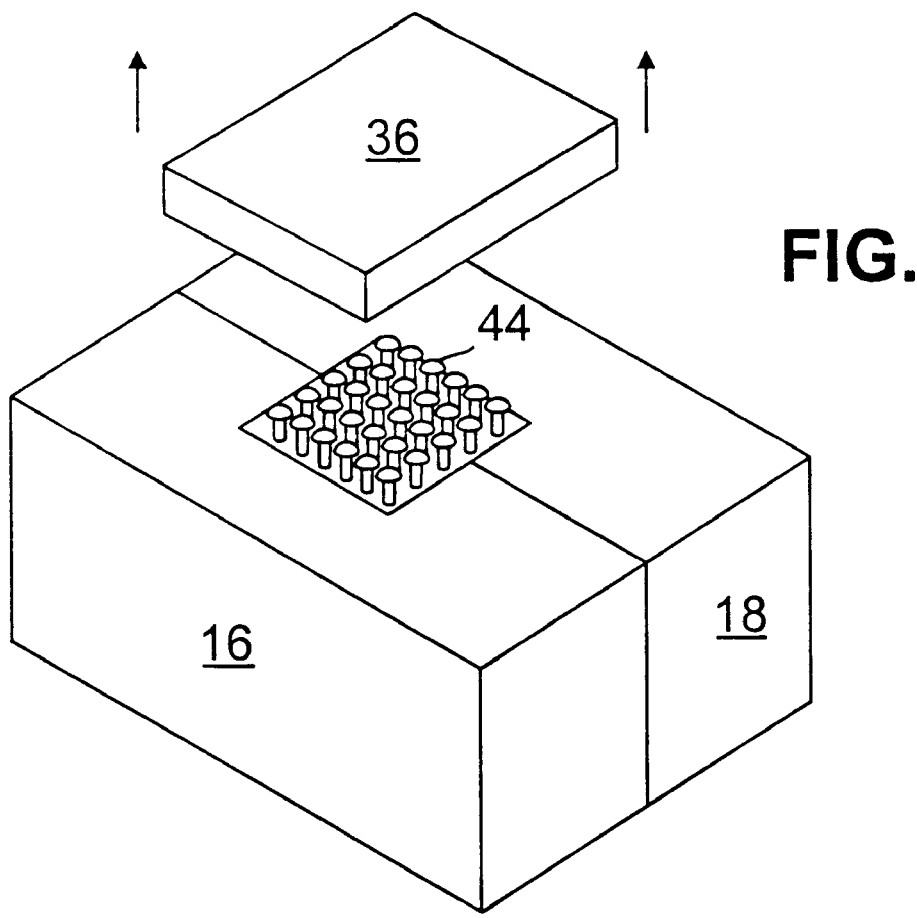
Figure 10:
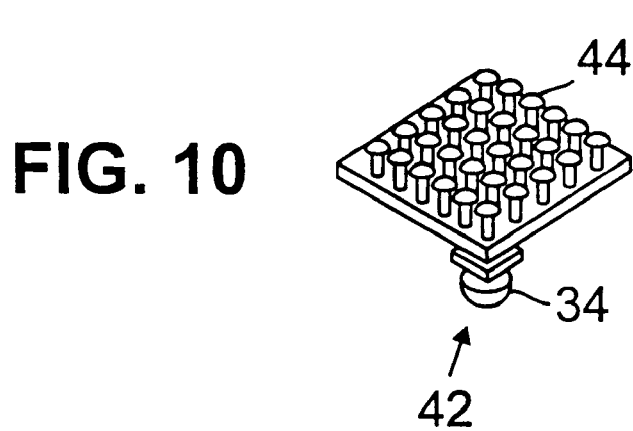
FIG. 10 is a perspective view of a finished fastener product.

FIGS. 7 through 9 sequentially illustrate the head-forming process of FIGS. 3 through 5 to produce a finished fastener product 42 (FIG. 10) with an array of mushroom-shaped headed fastener elements 44 opposite a holding feature 34. By permanently attaching fastener product 42 to a surface by means of holding feature 34 (e.g. by pressing christmas tree feature 34 through a hole in the surface), fastener elements 44 provide a means of releasably attaching a mating fastener product to the surface. In one particularly useful embodiment, fastener elements 44 are self-engaging, mushroom-shaped elements that develop high separation loads with relatively low engagement loads. Such double-sided fasteners have several useful applications, such as in attaching automobile trim and interior panels and carpeting, office partition panels and chair seat backs.

Figure 11:
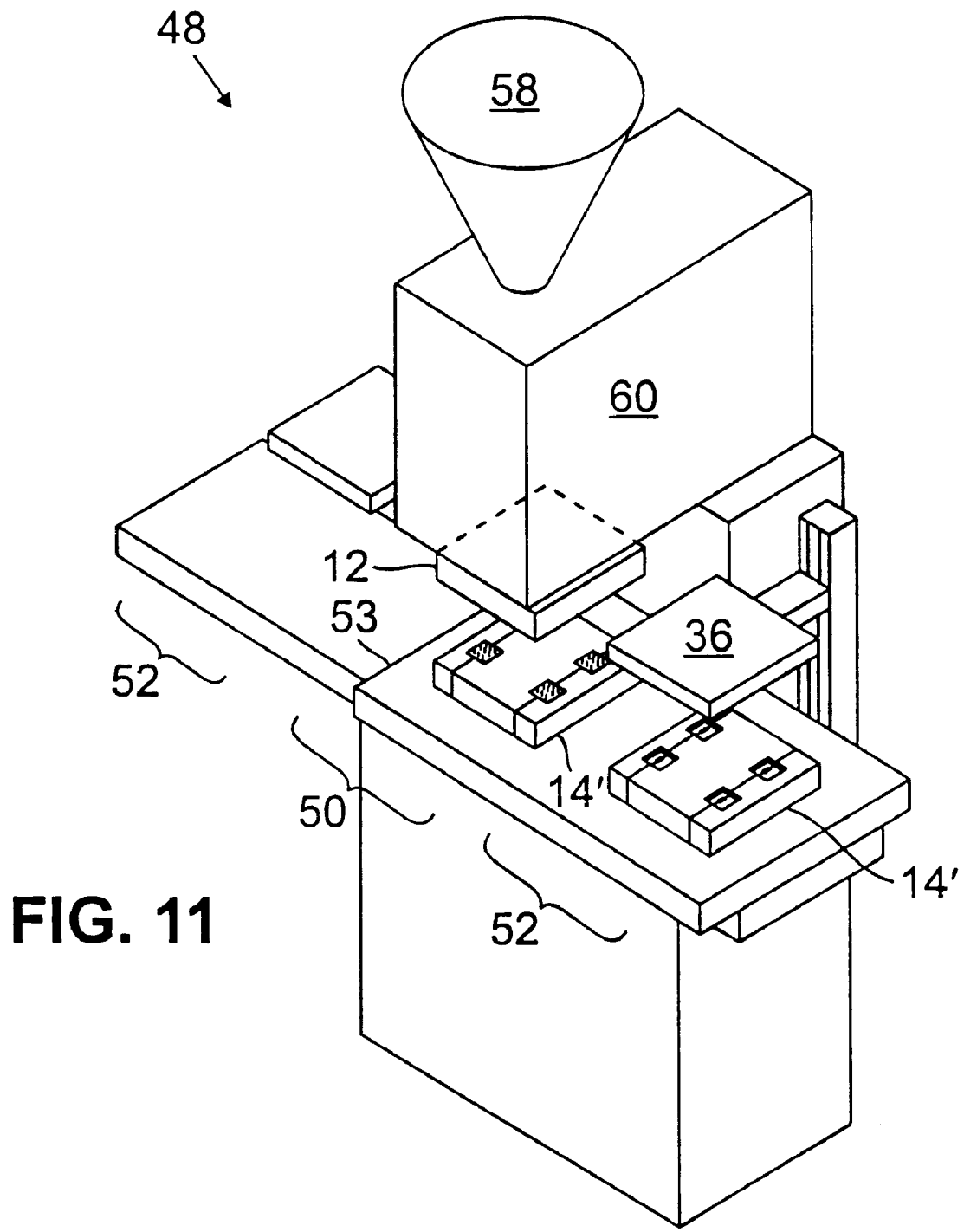
FIG. 11 schematically shows an apparatus for molding and post-forming fastener products, according to the invention, arranged to move molds in a reciprocating manner.
Figure 12:
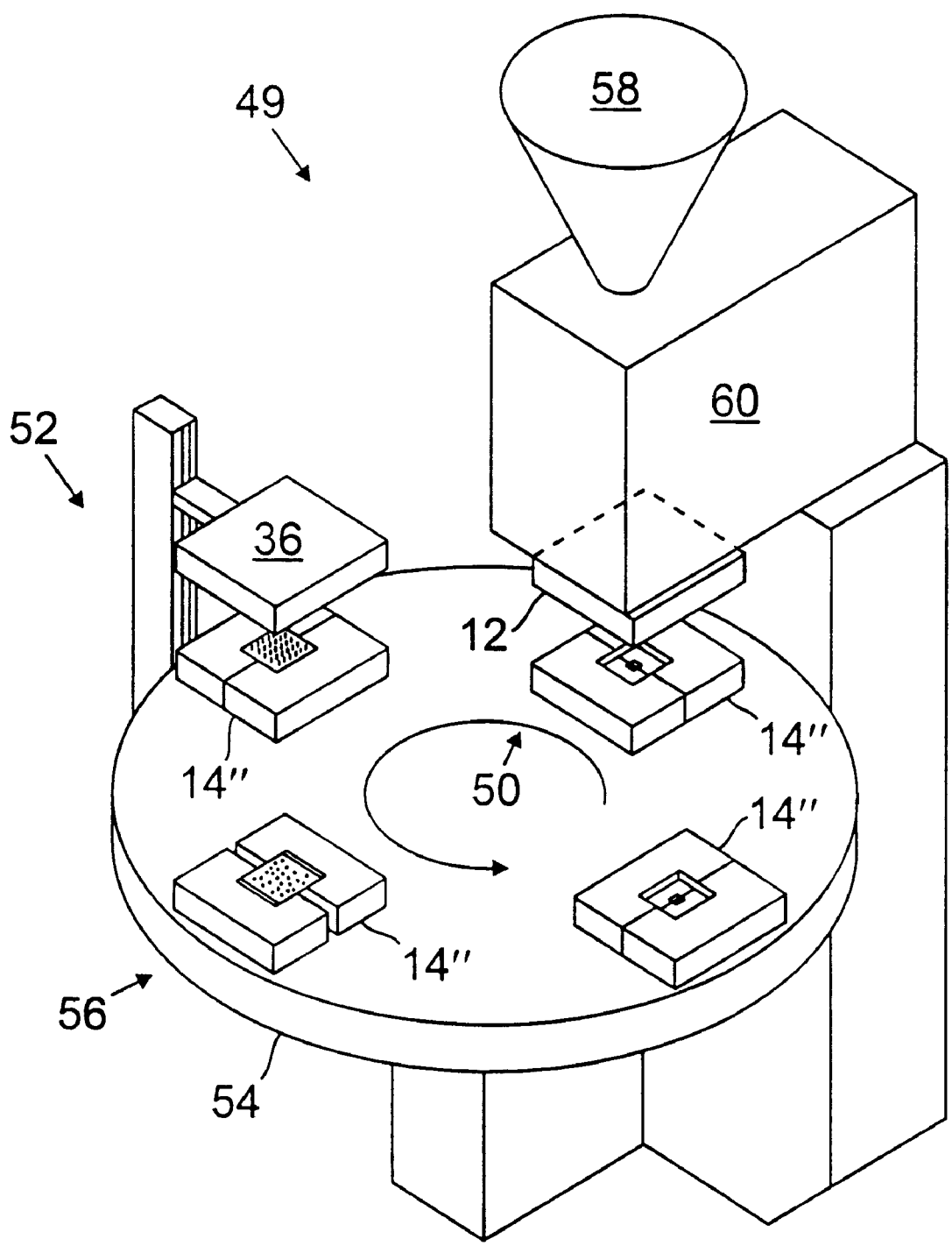
FIG. 12 schematically shows an apparatus similar to that of FIG. 11, arranged to move molds in a rotary manner.

FIGS. 11 and 12 are two embodiments of multiple-station machines, 48 and 49, respectively, for molding and post-forming fastener products, each having a molding station 50 and a forming station 52. In FIG. 11, lower mold parts 14' are mounted on a sliding table 53 which moves the lower molds reciprocally between a central molding station 50 and either of two forming stations 52. In FIG. 12, lower mold parts 14" are mounted on a rotary table 54 which moves the lower molds between molding station 50, forming station 52, and an ejection station 56. In both embodiments molding station 50 is shown as a vertical injection molding station with a hopper 58, an injector 60, and an upper mold part 12. Upper mold part 12 is lowered to one of the lower mold parts during the injection process. Forming station 52 has a heated forming plate 36 which is lowered to form heads on the molded fastener product preforms.

Both machines 48 and 49 are arranged to enable a forming station 52 to post-form heads on one preform product while molding station 50 is molding another preform product. In the reciprocating machine 48 of FIG. 11, sliding table 53 alternatingly places a lower mold part 14' under either the left-hand or right-hand forming plate 36 for a given cycle. In the rotary machine 49 of FIG. 12, four stations are shown, although two or more may be employed as needed.

Other advantages and embodiments are within the scope of the claims. For instance, in some configurations lower mold part 14 comprises more than two sections, as illustrated in mold parts 14' of FIG. 11, to define multiple mold cavities. In yet another embodiment (not shown), the lower mold part is a single piece and ejector pins are employed to remove the holding feature of the finished product from the mold cavity.

What is claimed is:

1. An apparatus for forming a fastener product having an injection-molded base and a two-dimensional array of spaced-apart, upstanding mushroom-shaped fastener elements extending from one side of the base, the apparatus comprising a mold for injection molding a preform member having an array of stems, the mold having
   a first part defining an array of straight cavities extending from a surface thereof, the array of cavities arranged to form the array of stems of the preform member, and
   a second part having a surface arranged in opposition to the surface of the first part, for molding the base of the fastener product therebetween, the first part being removable from the second part to expose the array of stems of the preform member while the member is retained by the second part, and
a forming device precisely aligned with the second part of the mold after the first part of the mold is removed, the forming device defining a respective array of cavities shaped to form an overhanging head on each stem, from material of the stem, to form the array of fastener elements of the fastener product while the stems are maintained in a precise, known position by the preform member being securely retained in the second part of the mold, the cavities of the forming device each being thereby aligned with a corresponding preform stem.

2. The apparatus of claim 1 wherein the forming device comprises a heated mold plate.

3. The apparatus of claim 1 wherein the second part of the mold defines a holding feature molding cavity extending from its surface for integrally molding a holding feature with the preform member for securing the fastener product to a surface in use, the second part of the mold adapted to retain the preform member by the holding feature while the fastener elements are formed.

4. The apparatus of claim 1 wherein the first mold part is spaced apart from the forming device, the apparatus comprising two said second mold parts and means to move one second mold part to alignment with the first mold part while moving the other second mold part to alignment with the forming device.

5. The apparatus of claim 4 wherein said means is constructed to move said two second mold parts along a reciprocal path.

6. The apparatus of claim 4 wherein said means is constructed to move said two second mold parts in a rotary sense.

7. The apparatus of claim 1 wherein the straight cavities of the first part of the mold are configured to mold stems about 0.08 inch long.

8. The apparatus of claim 1 wherein the straight cavities of the first part of the mold are configured to mold stems about 0.012 inch diameter, the cavities of the forming device being configured to form a mushroom-shaped head of about 0.040 inch diameter on each stem.

9. The apparatus of claim 3 wherein the second part of the mold has two sections defining therebetween the holding feature molding cavity, the two sections adapted to separate, after the overhanging heads are formed on the stems, to release the holding feature.

10. The apparatus of claim 3 wherein the holding feature molding cavity is shaped to form a christmas tree-type holding feature, adapted to be pressed through a hole for permanent attachment of the fastener product to a surface.

11. An apparatus for injection-molding a double-sided fastener product having a base, a two-dimensional array of at least 30 spaced-apart, upstanding mushroom-shaped fastener elements extending from one side of the base for releasable attachment of a mating fastener, and an integrally molded holding feature on an opposite side of the base for permanently attaching the fastener product to a surface, the apparatus comprising:

a mold for injection molding a preform member, the mold having a first part defining an array of straight cavities extending from a surface thereof, the array of cavities shaped and arranged to form an array of integrally molded preform stems on the preform member, corresponding to the fastener elements of the product, and a second part having a surface arranged in opposition to the surface of the first part, for molding the base of the product therebetween, the second part of the mold defining a holding feature molding cavity extending from its surface for integrally molding the holding feature of the product, the first part being removable from the second part to expose the array of stems of the preform member while the molded holding feature is retained within the holding feature molding cavity; and a forming device adapted to form an overhanging head on each stem, from material of the stem, while the molded holding feature is so retained, to form the array of fastener elements of the product.

12. The apparatus of claim 11 wherein the forming device comprises a heated forming plate adapted to apply a consistent pressure to the stems of the preform.

13. The apparatus of claim 11 wherein the straight cavities of the first part of the mold are configured to mold stems about 0.08 inch long.

14. The apparatus of claim 11 wherein the straight cavities of the first part of the mold are configured to mold stems about 0.012 inch diameter, the forming device being configured to form a head of about 0.040 inch diameter on each stem.

15. The apparatus of claim 11 wherein the second part of the mold has two sections defining therebetween the holding feature molding cavity, the two sections adapted to separate, after the overhanging heads are formed on the stems, to release the holding feature.

16. The apparatus of claim 11 wherein the holding feature molding cavity is shaped to form a christmas tree-type holding feature, adapted to be pressed through a hole for permanent attachment of the fastener product to a surface.

17. An apparatus for injection-molding a double-sided fastener product having a base, a two-dimensional array of at least 30 spaced-apart, upstanding mushroom-type fastener elements extending from one side of the base for releasable attachment of a mating fastener, and an integrally molded holding feature on an opposite side of the base for permanently attaching the fastener product to a surface, the apparatus comprising:

a mold for injection molding a preform member, the mold having a first part defining an array of straight cavities extending from a surface thereof, the array of cavities shaped and arranged to form an array of integrally molded preform stems on the preform member, corresponding to the fastener elements of the product, and a second part having a surface arranged in opposition to the surface of the first part, for molding the base of the product therebetween, the second part of the mold defining a holding feature molding cavity extending from its surface for integrally molding the holding feature of the product, the first part being removable from the second part to expose the array of stems of the preform member while the molded holding feature is retained within the holding feature molding cavity to maintain the stems in a precise, known position; and a forming device precisely aligned with the second part of the mold while the molded holding feature is so retained, the forming device defining an array of head-forming cavities shaped to form an overhanging, mushroom-type head on each stem, from material of the stem, to form the array of fastener elements of the product, alignment of the head-forming cavities with the stems being maintained by retention of the molded holding feature in the second part of the mold and alignment of the forming device with the second part of the mold.

18. The apparatus of claim 17 wherein the holding feature molding cavity is shaped to form a christmas tree-type holding feature, adapted to be pressed through a hole for permanent attachment of the fastener product to a surface.

* * * * *